(12) United States Patent
Andou

(10) Patent No.: US 11,540,233 B2
(45) Date of Patent: Dec. 27, 2022

(54) USER EQUIPMENT AND BASE STATION APPARATUS

(71) Applicant: NTT DOCOMO, INC., Tokyo (JP)

(72) Inventor: Kei Andou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/635,046

(22) PCT Filed: Jul. 30, 2018

(86) PCT No.: PCT/JP2018/028414
§ 371 (c)(1),
(2) Date: Jan. 29, 2020

(87) PCT Pub. No.: WO2019/026831
PCT Pub. Date: Feb. 7, 2019

(65) Prior Publication Data
US 2020/0252887 A1 Aug. 6, 2020

(30) Foreign Application Priority Data
Aug. 4, 2017 (JP) .............................. JP2017-151737

(51) Int. Cl.
*H04W 52/30* (2009.01)
*H04W 16/28* (2009.01)
*H04W 52/28* (2009.01)
*H04W 52/36* (2009.01)

(52) U.S. Cl.
CPC .......... *H04W 52/30* (2013.01); *H04W 16/28* (2013.01); *H04W 52/28* (2013.01); *H04W 52/365* (2013.01)

(58) Field of Classification Search
CPC ..... H04W 52/30; H04W 16/28; H04W 52/28; H04W 52/365
See application file for complete search history.

(56) References Cited

U.S. PATENT DOCUMENTS

| 10,425,900 | B2 * | 9/2019 | Liu | .................. H04W 52/08 |
| 2009/0197603 | A1 * | 8/2009 | Ji | .................. H04W 36/00835 455/436 |
| 2011/0103282 | A1 * | 5/2011 | Jeon | .................. H04W 52/40 370/331 |
| 2011/0105107 | A1 * | 5/2011 | Kwon | .................. H04W 72/0406 455/422.1 |

(Continued)

FOREIGN PATENT DOCUMENTS

WO    2014/021010 A1    2/2014

OTHER PUBLICATIONS

International Search Report issued in PCT/JP2018/028414 dated Sep. 11, 2018 (3 pages).

(Continued)

*Primary Examiner* — Md K Talukder
(74) *Attorney, Agent, or Firm* — Osha Bergman Watanabe & Burton LLP

(57) ABSTRACT

A terminal for communicating with a base station apparatus is disclosed, the terminal including a controller that sets maximum transmission power based on an Effective Isotropic Radiated Power (EIRP) of the terminal; and a transmitter that transmits an uplink signal based on the maximum transmission power. In other aspects, a communication method by a terminal for communicating with a base station apparatus is also disclosed.

7 Claims, 10 Drawing Sheets

(56) References Cited

U.S. PATENT DOCUMENTS

| | | | | |
|---|---|---|---|---|
| 2011/0105174 | A1* | 5/2011 | Pelletier | H04L 1/1812 |
| | | | | 455/522 |
| 2013/0165134 | A1* | 6/2013 | Touag | H04W 72/0486 |
| | | | | 455/452.1 |
| 2014/0177607 | A1* | 6/2014 | Li | H04B 7/0695 |
| | | | | 370/336 |
| 2015/0195019 | A1 | 7/2015 | Nagata et al. | |
| 2015/0282104 | A1* | 10/2015 | Damnjanovic | H04W 52/32 |
| | | | | 455/522 |
| 2016/0094481 | A1* | 3/2016 | Xu | H04B 7/18517 |
| | | | | 370/230 |
| 2016/0165547 | A1* | 6/2016 | Ouchi | H04L 5/14 |
| | | | | 455/522 |
| 2016/0174173 | A1* | 6/2016 | Lee | H04W 72/042 |
| | | | | 370/280 |
| 2019/0098586 | A1* | 3/2019 | Akkarakaran | H04W 72/1268 |
| 2019/0104477 | A1* | 4/2019 | MolavianJazi | H04W 72/0473 |
| 2019/0104549 | A1* | 4/2019 | Deng | H04W 72/0453 |
| 2019/0159136 | A1* | 5/2019 | MolavianJazi | H04L 5/001 |
| 2019/0349863 | A1* | 11/2019 | Lim | H04W 52/42 |
| 2020/0037254 | A1* | 1/2020 | Comsa | H04W 52/281 |
| 2020/0053724 | A1* | 2/2020 | MolavianJazi | H04W 52/34 |
| 2020/0112926 | A1* | 4/2020 | Laghate | H04B 7/0404 |
| 2020/0163031 | A1* | 5/2020 | Loehr | H04W 52/365 |
| 2020/0252887 | A1* | 8/2020 | Andou | H04W 52/146 |

OTHER PUBLICATIONS

Written Opinion of the International Searching Authority issued in PCT/JP2018/028414 dated Sep. 11, 2018 (3 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).
NTT DOCOMO, Inc.; "PCMAX in mmWave OTA"; 3GPP TSG-RAN WG4 Meeting #84, R4-1707509; Berlin, Germany; Aug. 21-25, 2017 (3 pages).
Extended European Search Report issued in counterpart European Patent Application No. 18841597.0, dated Mar. 22, 2021 (9 pages).
LG Electronics; "NR UE power class and MPR/A-MPR"; 3GPP TSG RAN WG4 NR #2 meeting, R4-1706575; Qingdao, P.R. China; Jun. 27-29, 2017 (5 pages).
Samsung; "Definition of UE Power Class for mmWave"; 3GPP TSG-RAN WG4 Meeting NR #2, R4-1706648; Qingdao, China; Jun. 27-29, 2017 (7 pages).
Intel Corporation, Huawei, LGE; "WF on power class framework for mmWave"; 3GPP TSG-RAN WG4 NR AH Meeting #2, R4-1706935; Qingdao, China; Jun. 27-29, 2017 (6 pages).
Office Action issued in the counterpart Indian Patent Application No. 202037002226, dated Mar. 25, 2021 (8 pages).
3GPP TS 36.321 V14.3.0; "3rd Generation Partnership Project; Technical Specification Group Radio Access Network; Evolved Universal Terrestrial Radio Access (E-UTRA); Medium Access Control (MAC) protocol specification (Release 14)"; Jun. 2017 (107 pages).
Office Action issued in European Application No. 18841597.0; dated Jan. 14, 2022 (5 pages).
Office Action issued in the counterpart Japanese Patent Application No. 2019-534492, dated May 17, 2022 (5 pages).
Ericsson; "The UE power class and its relation to power-control equations and PHR for mmW"; TSG-RAN Working Group 4 (Radio) meeting NR#2, R4-1706622; Qingdao, China, Jun. 27-29, 2017 (4 pages).
Ericsson, Sony; "Definition of UE power class"; TSG-RAN Working Group 4 (Radio) meeting #83, R4-1705106; Hangzhou, China, May 15-19, 2017 (7 pages).
MediaTek Inc.; "mmW UE power class"; 3GPP TSG-RAN WG4 Meeting #83, R4-1705677; Hangzhou, China, May 15-19, 2017 (3 pages).
Qualcomm Incorporated; "Output power Requirement for mmW"; 3GPP TSG-RAN WG4—NR-AH#2, R4-1706624; Qingdao, China, Jun. 29-30, 2017 (6 pages).
Office Action issued in European Application No. 18841597.0 dated Oct. 28, 2022 (5 pages).

\* cited by examiner

DIGITAL BEAM FORMING

ANALOG BEAM FORMING

Phase shifters

HYBRID BEAM FORMING

USER EQUIPMENT AND BASE STATION APPARATUS

TECHNICAL FIELD

The present invention relates to user equipment and a base station apparatus in a radio communication system.

BACKGROUND ART

In 3rd Generation Partnership Project (3GPP), in order to achieve larger system capacity, a higher data transmission rate, and further reduction of latency in a radio section, etc., a radio communication scheme called 5G or New Radio (NR) (the radio communication scheme is referred to as "5G" or "NR" below) has been studied. In 5G, in order to meet the requirement that the latency in a radio section is reduced to be less than or equal to 1 ms, while achieving a transmission rate of greater than or equal to 10 Gbps, various radio technologies have been studied.

In 5G, a radio communication using a millimeter wave has been studied, and use of a wide frequency range up to a frequency band that is higher than that of Long Term Evolution (LTE) has been assumed. Especially, since a propagation loss increases in a high frequency band, in order to compensate for the propagation loss, application of beam forming with a narrow beam width has been studied (e.g., Non-Patent Document 1).

PRIOR ART DOCUMENT

Non-Patent Document

Non-Patent Document 1: 3GPP TS 36.211 V14.3.0 (2017-06)

SUMMARY OF THE INVENTION

Problem to be Solved by the Invention

In the current study of the 5G system, a requirement on maximum transmission power for a case in which user equipment performs transmission using beam forming has not been clarified. When user equipment performs transmission using beam forming, antenna gain significantly varies depending on a direction of a beam, so that a case is assumed in which correct transmission power control may not be performed.

The present invention has been accomplished in view of the above-described point, and an object is for performing appropriate transmission power control by user equipment supporting transmission using beam forming.

Means for Solving the Problem

According to the disclosed technology, there is provided user equipment for communicating with a base station apparatus including a transmitter that performs transmission to the base station while performing beam forming using an antenna with directivity; and a controller that controls maximum transmission power of the transmission with the beam forming based on gain of the antenna.

Advantage of the Invention

According to the disclosed technology, user equipment supporting beam forming can perform appropriate transmission power control.

EMBODIMENTS OF THE INVENTION

Figure 1:
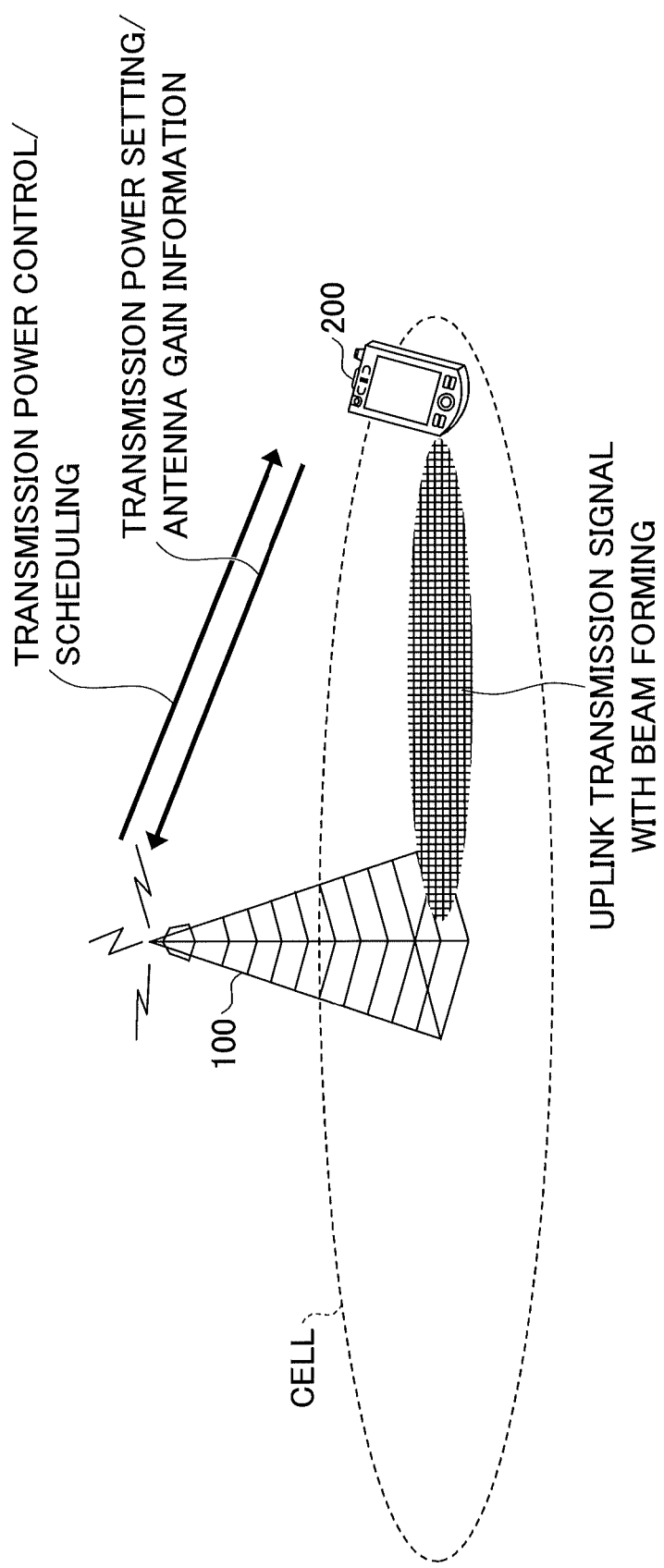
FIG. 1 is a diagram illustrating an example of a configuration of a radio communication system according to an embodiment of the present invention.

In the following, embodiments of the present invention are described by referring to the drawings. Note that the embodiments described below are merely examples, and embodiments to which the present invention is applied are not limited to the embodiments described below.

As for an operation of a radio communication system according to the embodiments, existing technologies can be used as appropriate. The existing technology is, for example, existing LTE. However, the existing technology is not limited to the existing LTE. Furthermore, "LTE" used in the present specification has broad meaning including LTE-Advanced and a scheme subsequent to LTE-Advance (e.g., 5G or NR), unless as otherwise specified.

In the embodiments described below, terms used in the existing LTE, such as a Synchronization Signal (SS), a Primary SS (PSS), a Secondary SS (SSS), and a Physical broadcast channel (PBCH), are used. These are for convenience of the description, and signals, functions, etc., similar to these may be referred to by different names. Furthermore, in NR, the above-described terms are denoted as a NR-SS, a NR-PSS, a NR-SSS, a NR-PBCH, etc.

<System Configuration>

FIG. 1 is a diagram illustrating an example of a configuration of a radio communication system according to an embodiment of the present invention. As illustrated in FIG. 1, the radio communication system according to the embodiment of the present invention includes a base station apparatus 100 and user equipment 200. In FIG. 1, one base station apparatus 100 and one user equipment 200 are illustrated. However, this is an example, and there may be a plurality of base station apparatuses 100 and a plurality of units of user equipment 200.

The base station apparatus 100 is a communication apparatus for performing radio communication with the user equipment 200 by providing one or more cells. As illustrated in FIG. 1, the base station apparatus 100 transmits information related to transmission power control and information related to scheduling to the user equipment 200. The information related to the transmission power control is, for example, a Transmission Power Control command (TPC command) transmitted in Downlink Control Information (DCI). By the TPC command, an absolute value or an accumulated value of transmission power of a Physical Uplink Shared Channel (PUSCH) is transmitted to the user equipment 200. Furthermore, for example, the information related to scheduling is information for identifying, by the DCI, a resource to be used for uplink or downlink, and the information for identifying the resource is transmitted to the user equipment 200.

As shown in FIG. 1, the user equipment 200 transmits information related to a transmission power setting and antenna gain information to the base station apparatus 100. The information related to the transmission power setting is, for example, Power Head Room (PHR). By the PHR, the user equipment 200 transmits, to the base station apparatus 100, information indicating a value obtained by subtracting current transmission power from a maximum transmission power. The antenna gain information is information indicating antenna gain in a direction in which the user equipment 200 is currently performing transmission (details are described below).

Additionally, as illustrated in FIG. 1, the user equipment 200 transmits, toward the base station apparatus 100, an uplink transmission signal with beam forming.

Note that, in the embodiment, a duplex (Duplex) scheme may be a Frequency Division Duplex (FDD) scheme, or a scheme other than that (e.g., Flexible Duplex). Furthermore, in the following description, transmitting a signal using a transmission beam may be equivalent to transmitting a signal to which a precoding vector is multiplexed (precoded with the precoding vector). Similarly, receiving a signal using a reception beam may be equivalent to multiplexing a predetermined weight vector to the received signal. Additionally, transmitting a signal using a transmission beam may be represented as transmitting the signal with a specific antenna port. Similarly, receiving a signal using a reception beam may be represented as receiving the signal with a specific antenna port. An antenna port refers to a logical antenna port of a physical antenna port defined by the 3GPP standard. Note that, a method of forming the transmission beam and the reception beam is not limited to the above-described method. For example, in the base station apparatus 100 and the user equipment 200, each including a plurality of antennas, a method may be used in which angles of the respective antennas are varied; a method may be used in which a method using a precoding vector and a method in which angles of the antennas are varied are combined; or another method may be used. Additionally, for example, in a high frequency band, a plurality of mutually different transmission beams may be used. A case in which a plurality of transmission beams is used is referred to as a multi-beam operation, and a case in which a single transmission beam is used is referred to as a single beam operation.

<Example of Beam Forming>

Figure 2:
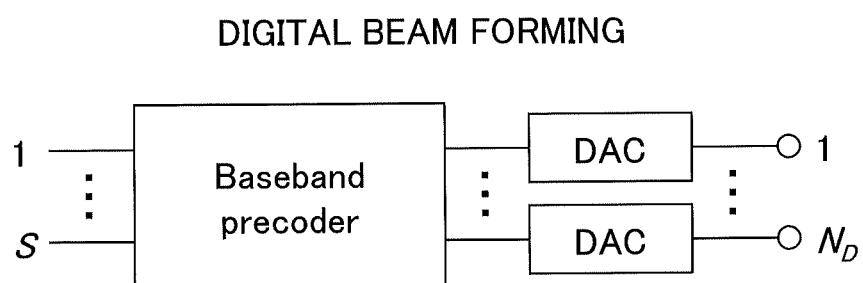
FIG. 2 is a diagram illustrating an example of a configuration of a circuit that performs digital beam forming.

FIG. 2 is a diagram illustrating an example of a configuration of a circuit for performing digital beam forming. As a method for implementing beam forming, digital beam forming has been studied such that, as illustrated in FIG. 2, Digital-to-Analog Converters (DACs) are included, where a number of the DACs is equal to a number of transmission antenna elements, and that baseband signal processing for precoding is performed for a number of times equal to the number of the transmission antenna elements.

Figure 3:
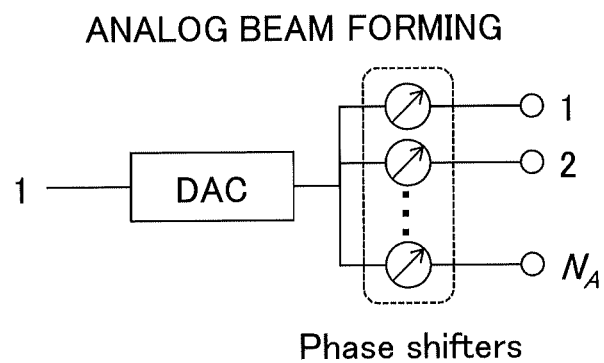
FIG. 3 is a diagram illustrating an example of a configuration of a circuit that performs analog beam forming.

FIG. 3 is a diagram illustrating an example of a configuration of a circuit for performing analog beam forming. As a method for implementing analog beam forming, analog beam forming has been studied such that beam forming is implemented using variable phase shifters in a Radio Frequency (RF) circuit, subsequent to converting a transmission signal into an analog signal using a DAC.

Figure 4:
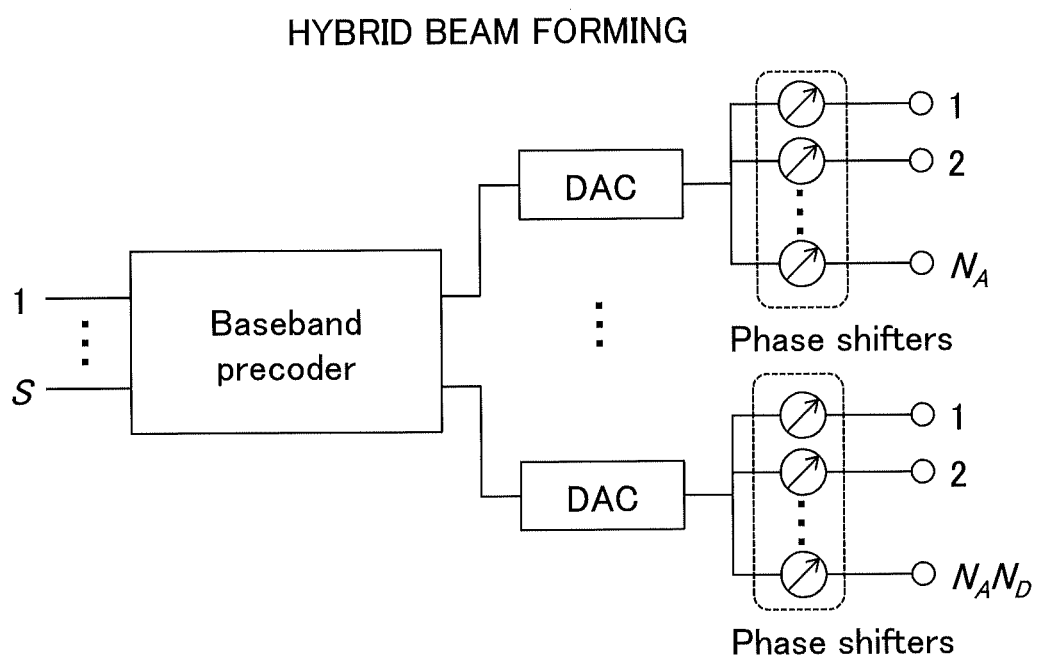
FIG. 4 is a diagram illustrating an example of a configuration of a circuit that performs hybrid beam forming.

FIG. 4 is a diagram illustrating an example of a configuration of a circuit for performing hybrid beam forming. As illustrated in FIG. 4, hybrid beam forming has been studied such that beam forming processing is implemented by both baseband signal processing for precoding and phase shifters in an RF circuit by combining digital beam forming and analog beam forming.

EXAMPLE 1

In the following, Example 1 is described.

Figure 5:
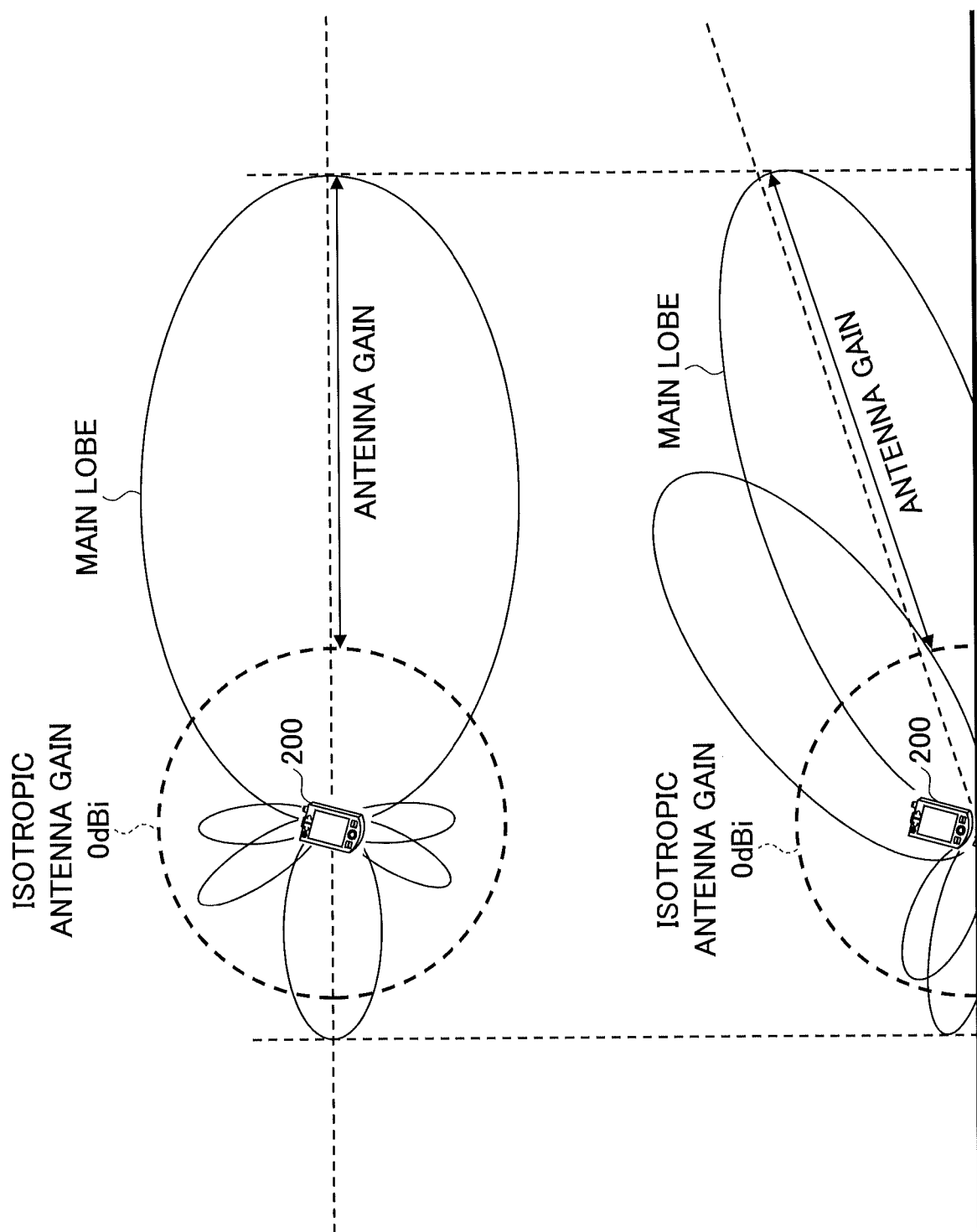
FIG. 5 is a diagram illustrating antenna gain during beam forming according to an embodiment of the present invention.

FIG. 5 is a diagram illustrating antenna gain during beam forming in an embodiment of the present invention. FIG. 5 schematically shows antenna characteristics of the user equipment 200 during beam forming. As illustrated in FIG. 5, the antenna characteristics of the user equipment 200 during beam forming are provided with directivity.

The upper part of FIG. 5 shows the antenna characteristics in a horizontal plane, and a main lobe corresponding to the maximum radiation and other side lobes are shown. As illustrated in FIG. 5, since the antenna is provided with directivity, gain significantly varies depending on a radiation angle. The distance from a dotted line representing isotropic antenna gain of 0 dBi to a maximum radiation of the main lobe is the antenna gain of the directivity antenna of the user equipment 200.

The lower part of FIG. 5 shows the antenna characteristics in a vertical plane, and a main lobe corresponding to the maximum radiation and other side lobes are shown. A hemispherical vertical surface is displayed because the user equipment 200 is assumed to be on the ground surface, however, electric power is actually radiated spherically.

Here, a method of defining a Cumulative Distribution Function (CDF) for Equivalent Isotropic Radiated Power (EIRP) is described. For electric power spherically radiated from an antenna, a plurality of test points for measuring electric power is defined in a three-dimensional spherical shape centered on a terminal, and electric power at each test point is measured. A CDF can be obtained by plotting a ratio of achievable EIRP at each test point as a cumulative distribution.

Furthermore, in embodiments of the present invention, the user equipment 200 calculates antenna gain in a direction in which the user equipment 200 is currently performing transmission, such as that illustrated in FIG. 5, for example, by storing, in advance, a correspondence between a value of gain in dB and a direction of a beam represented by an Elevation angle and an Azimuth angle. Alternatively, the antenna gain may be calculated by any other algorithm. Namely, the user equipment 200 can obtain antenna gain in a direction in which the user equipment is currently performing transmission.

Figure 6:
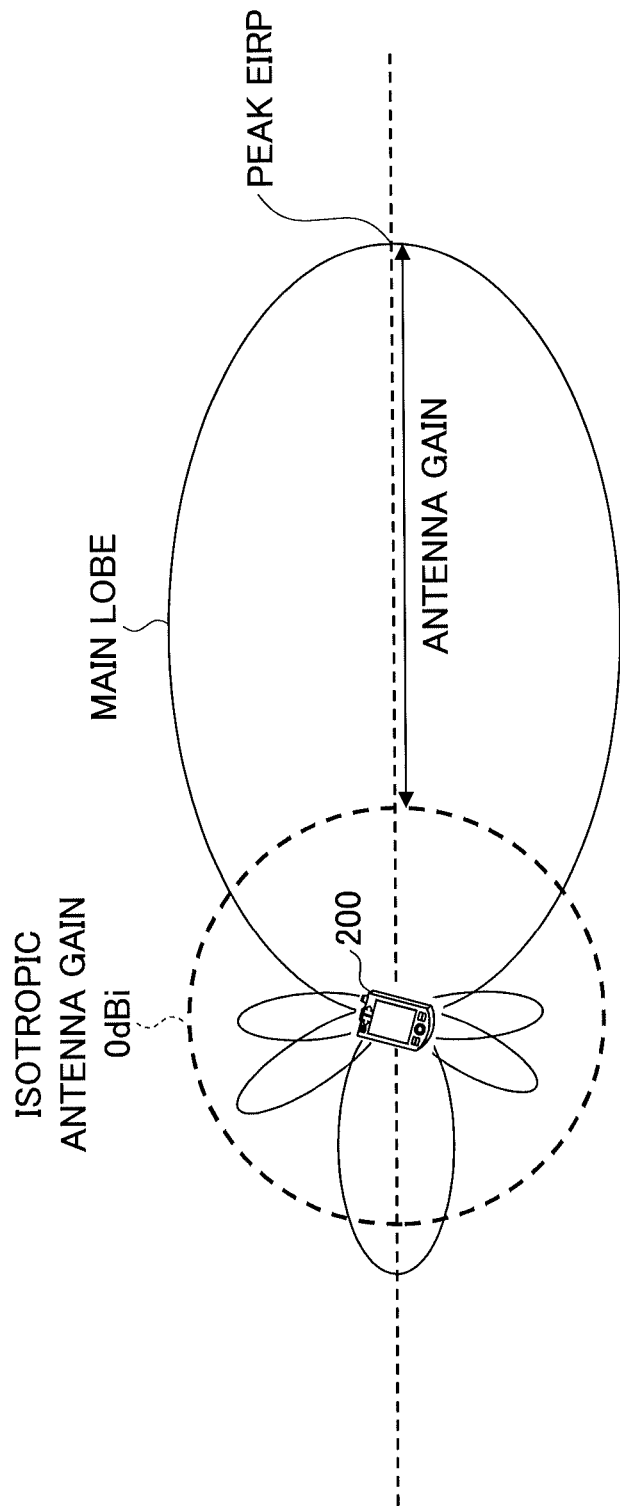
FIG. 6 is a diagram (version 1) illustrating a case according to an embodiment of the present invention in which transmission power is defined in terms of a peak EIRP value.

FIG. 6 is a diagram (version 1) for describing a case in which transmission power is defined in terms of a peak EIRP value according to an embodiment of the present invention. FIG. 6 schematically shows antenna characteristics of the user equipment 200 on a horizontal surface.

As illustrated in FIG. 6, a maximum radiation in a main lobe of an antenna of the user equipment 200 corresponds to peak EIRP. Namely, the peak EIRP can be achieved in a direction in which the antenna of the user equipment 200 can achieve the maximum antenna gain. At this time, a distance from the dotted line indicated by isotropic antenna gain of 0 dBi to a tip of the main lobe corresponds to the antenna gain. For example, if transmission power at an end of an antenna connector is 20 dBm and peak EIRP is 30 dBm, the antenna gain for achieving the peak EIRP is 10 dB. If the user equipment 200 does not achieve the peak EIRP, namely, if the user equipment is not transmitting toward boresight, the antenna gain is reduced to 7 dB, for example.

Here, an example of transmission power control of the user equipment 200 is described. A maximum transmission power $P_{CMAX,c}$ of the user equipment 200 in LTE is provided by the following formulas:

$$P_{CMAX\_L,c} \leq P_{CMAX,c} \leq P_{CMAX\_H,c},$$

where $P_{CMAX\_L,c}$=MIN$\{P_{EMAX,c}-\Delta T_{C,c}, (P_{PowerClass}-\Delta P_{PowerClass})$-MAX(MPR$_c$+A-MPR$_c$+$\Delta T_{IB,c}$+$\Delta T_{C,c}$+$\Delta T_{ProSe}$,P-MPR$_c$)$\}$, $P_{CMAX\_H,c}$=MIN$\{P_{EMAX,c}, P_{PowerClass}-\Delta P_{PowerClass}\}$ and $P_{EMAX,c}$ is a maximum transmission power of user equipment. $P_{PowerClass}$ is a maximum transmission power in accordance with a class of the user equipment. For example, typical LTE user equipment is class 3, and the maximum transmission power is defined to be 23 dBm. Maximum Power Reduction (MPR) is a decrement in the maximum electric power. Additional MPR (A-MPR) is an additional decrement in the maximum electric power. $\Delta T$ is, for example, a correction value of a tolerance.

The maximum transmission power $P_{CMAX}$ is obtained by a calculation formula using $P_{PowerClass}$ as a reference, as shown in the above-described formulas. $P_{PowerClass}$ is the maximum transmission power at an end of an antenna connector.

Here, in 5G, suppose that $P_{PowerClass}$ is defined to be 30 dBm, which is the peak EIRP including antenna gain, and that other parameters are set to zero to simplify the calculation. Then, the maximum transmission power $P_{cmax,C}$ becomes 30 dBm. Here, $P_{EMAX,c}$ is assumed to be a sufficiently large value. Suppose that, when the user equipment 200 achieves the peak EIRP, namely, when the user equipment 200 is performing transmission toward the boresight of the antenna, the antenna gain is 10 dB. Then, the transmission power at the end of the antenna connector is 20 dBm.

However, when the user equipment 200 is not performing transmission toward the boresight of the antenna, the antenna gain varies to be 7 dB, for example. At this time, in principle, maximum transmission power capability that can be transmitted by the user equipment 200 is 27 dBm. Here, transmission power of PUSCH in LTE is defined by the formula described below.

$$P_{PUSCH,c}(i) = \min\{P_{CMAX,c}(i), 10 \log_{10}(M_{PUSCH,c}(i)) + P_{O\_PUSCH,c}(j) + \alpha_c(j)PL_c + \Delta T_{F,c}(i) + f_c(i)\}$$

According to the above-described formula, a case occurs in which the transmission power of the PUSCH becomes 30 dBm, which is a value of $P_{CMAX,c}$ based on $P_{PowerClass}$, so that maximum transmission power exceeding the capability of the user equipment 200 may be set, and appropriate power control may be unable to be performed. Such power control may adversely affect power consumption of the user equipment 200, network scheduling, etc.

Accordingly, in Example 1, maximum transmission power is appropriately set by correcting the maximum transmission power in accordance with antenna gain in a direction in which the user equipment 200 is performing transmission. In the following formula that defines the maximum transmission power $P_{CMAX,c}$, a parameter "$\Delta G_c$" corresponding to the correction is newly introduced.

$$P_{CMAX\_L,c}=\text{MIN}\{P_{EMAX,c}-\Delta T_{C,c},(P_{PowerClass}-\Delta G_c-\Delta P_{PowerClass})-\text{MAX}(MPR_c+A-MPR_c+\Delta T_{IB,c}+\Delta T_{C,c}+\Delta T_{ProSe},P-MPR_c)\}$$

$$P_{CMAX\_H,c}=\text{MIN}\{P_{EMAX,c},P_{PowerClass}-\Delta G_c-\Delta P_{PowerClass}\}$$

$P_{PowerClass}$ is assumed to be defined by the peak EIRP value. Accordingly, the above-described "$\Delta G_c$" is a differential value obtained by subtracting the current antenna gain of the user equipment 200 from the antenna gain at a time at which the user equipment 200 achieves the peak EIRP with respect to the serving cell c. Thus, "$\Delta G_c$" always takes a positive value. By correcting $P_{CMAX,c}$ by "$\Delta G_c$," a parameter for calculating the maximum transmission power can be corrected in accordance with antenna gain in a direction in which the user equipment 200 is currently performing transmission, and maximum transmission power can be appropriately set.

Furthermore, the user equipment 200 may transmit, to the base station 100, information on the setting of the maximum transmission power calculated by the above-described method based on the antenna gain through Uplink Control Information (UCI), Medium Access Control (MAC) signaling, etc. Additionally, together with the information on the setting of the maximum transmission power, or instead of the information on the setting of the maximum transmission power, information indicating antenna gain in a direction in which the user equipment 200 is currently performing transmission may be transmitted to the base station apparatus 100.

Furthermore, the user equipment 200 may insert the above-described information on the setting of the maximum transmission power and/or the information indicating antenna gain into PHR, so that the above-described information on the setting of the maximum transmission power and/or the information indicating antenna gain can be transmitted to the base station apparatus 100. PHR includes information indicating a value obtained by subtracting current transmission power from the maximum transmission power of the user equipment 200. By additionally inserting the information on the setting of the maximum transmission power and/or the information indicating the antenna gain according to Example 1, the base station apparatus 100 can perform accurate transmission power control for the user equipment 200.

Based on the information on the setting of the maximum transmission power and/or the information indicating the antenna gain transmitted from the user equipment 200, the base station apparatus 100 performs network control, namely, performs transmission power control and scheduling for the user equipment 200.

Note that, in the above-described method of calculating the maximum transmission power, it suffices if the maximum transmission power is calculated based on the information on the antenna gain of the user equipment 200. The method of calculating the maximum transmission power is not limited to the method based on the above-described formulas, etc.

Figure 7:
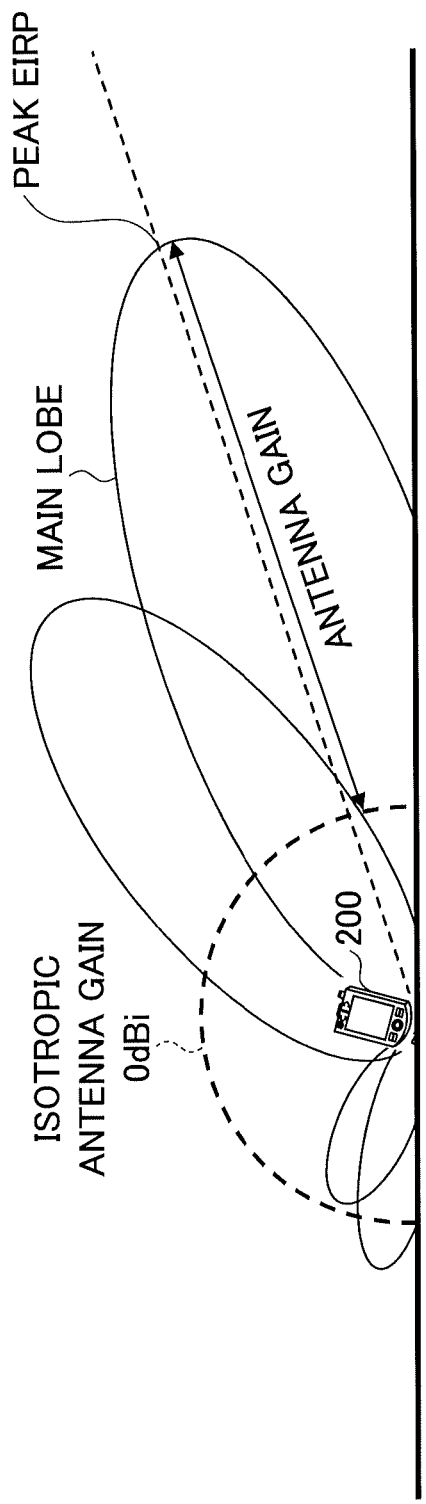
FIG. 7 is a diagram (version 2) illustrating a case according to an embodiment of the present invention in which transmission power is defined in terms of a peak EIRP value.

FIG. 7 is a diagram (version 2) for illustrating a case in which transmission power is defined by the peak EIRP value according to an embodiment of the present invention. FIG. 7 schematically shows antenna characteristics of the user equipment 200 on a vertical surface.

In FIG. 7, similar to FIG. 6, the maximum radiation in the main lobe of the antenna of the user equipment 200 corresponds to the peak EIRP. Accordingly, in a direction in which the antenna of the user equipment 200 can achieve the maximum antenna gain, the peak EIRP can be achieved. At this time, a distance from the dotted line indicated by the isotropic antenna gain of 0 dBi to the tip of the main lobe corresponds to the antenna gain.

By the above-described Example 1, inappropriate setting of the maximum transmission power can be avoided, such as setting of maximum transmission power exceeding the capability of the user equipment 200, by setting the maximum transmission power based on the antenna gain in a direction (a direction toward the base station) in which the user equipment 200 is performing transmission, and appropriate transmission power control and scheduling can be achieved.

EXAMPLE 2

Example 2 is described below. In Example 2, points different from Example 1 are described. Accordingly, points that are not particularly described may be the same as those of Example 1.

Figure 8:
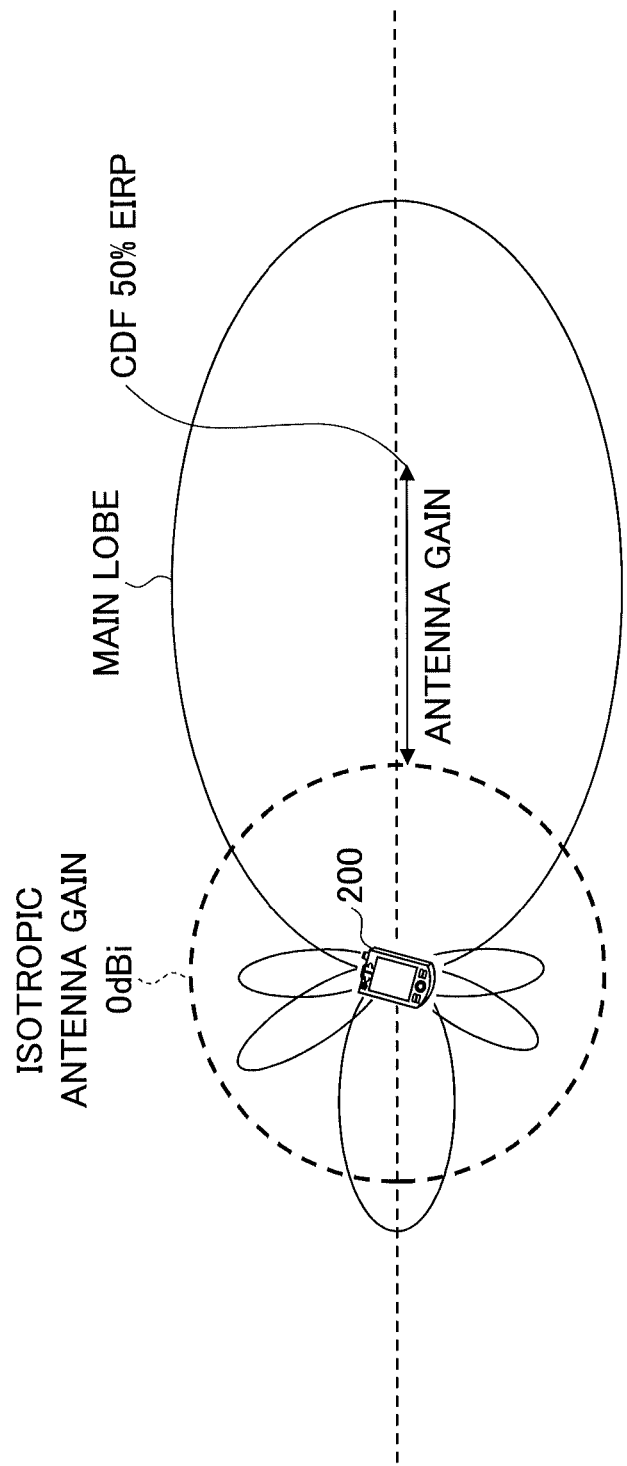
FIG. 8 is a diagram (version 1) illustrating a case according to an embodiment of the present invention in which transmission power is defined in terms of an EIRP value based on a CDF.

FIG. 8 is a diagram (version 1) for illustrating a case in which transmission power is defined by an EIRP value based on a CDF according to an embodiment of the present invention. FIG. 8 schematically illustrates antenna characteristics of the user equipment 200 on a horizontal surface.

In Example 2, $P_{PowerClass}$ is defined by an EIRP value with which a CDF of an antenna of the user equipment 200 shown in FIG. 8 becomes 50%. At this time, a distance from the dotted line indicated by isotropic antenna gain of 0 dBi to a position at which EIRP with the CDF of 50% is achieved corresponds to the antenna gain. For example, if transmission power at an end of an antenna connector is 20 dBm and EIRP with which the CDF becomes 50% is 27 dBm, the antenna gain is 7 dB. Here, if the user equipment 200 performs transmission toward the center of the boresight of the antenna, the antenna gain increases to be 10 dB, for example. In contrast, if the user equipment 200 performs transmission in a direction deviated from the boresight of the antenna, the antenna gain decreases to be 3 dB, for example.

Similar to Example 1, in 5G, by defining $P_{PowerClass}$ by the EIRP of 27 dBm with which the CDF including the antenna gain becomes 50%, and setting other parameters to zero to simplify the calculation, the maximum transmission power $P_{cmax,C}$ becomes 27 dBm. If the antenna gain is 7 dB at a time at which the EIRP with which the CDF becomes 50% is achieved, the transmission power at an end of an antenna connector becomes 20 dBm.

However, when the user equipment 200 performs transmission toward the center of the boresight of the antenna, the antenna gain varies to be 10 dB, for example. At this time, in principle, the maximum transmission power capability that can be transmitted by the user equipment 200 is 30 dBm. Here, the transmission power of PUSCH in LTE is defined by the formula described below.

$$P_{PUSCH,c} = \min\{P_{CMAX,c}(i), 10 \log_{10}(M_{PUSCH,c}(i)) + P_{O\_PUSCH,c}(j) + \alpha_c(j)PL_c + \Delta T_{F,c}(i) + f_c(i)\}$$

According to the above-described formula, a case occurs in which the transmission power of PUSCH becomes 27 dBm, which is the value of $P_{CMAX,c}$ based on $P_{PowerClass}$, so that maximum transmission power less than the capability of the user equipment 200 may be set, and appropriate power control may be unable to be performed. Such power control may adversely affect power consumption of the user equipment 200, network scheduling, etc.

In contrast, when the user equipment 200 performs transmission in a direction deviated from the boresight of the antenna, the antenna gain varies to be 3 dB, for example. At this time, in principle, the maximum transmission power capability that can be transmitted by the user equipment 200 is 23 dBm. Here, the transmission power of PUSCH in LTE is defined by the formula described below.

$$P_{PUSCH,c}(i) = \min\{P_{CMAX,c}(i), 10 \log_{10}(M_{PUSCH,c}(i)) + P_{PUSCH,c}(j) + \alpha_c(j)PL_c + \Delta T_{F,c}(i) + f_c(i)\}$$

According to the above-described formula, a case occurs in which the transmission power of PUSCH becomes 27 dBm, which is the value of $P_{CMAX,c}$ based on $P_{PowerClass}$, so that maximum transmission power exceeding the capability of the user equipment 200 may be set, and appropriate power control may be unable to be performed. Such power control may adversely affect power consumption of the user equipment 200, network scheduling, etc.

Accordingly, similar to Example 1, in Example 2, maximum transmission power is appropriately set by correcting the maximum transmission power in accordance with antenna gain in a direction in which the user equipment 200 is performing transmission. In the following formula that defines the maximum transmission power $P_{CMAX,c}$, a parameter "$\Delta G_c$" corresponding to the correction is newly introduced.

$$P_{CMAX\_L,c} = \mathrm{MIN}\{P_{EMAX,c} - \Delta T_{C,c}, (P_{PowerClass} - \Delta G_c - \Delta P_{PowerClass}) - \mathrm{MAX}(MPR_c + A\text{-}MPR_c + \Delta T_{IB,c} + \Delta T_{C,c} + \Delta T_{ProSe}, P\text{-}MPR_c)\}$$

$$P_{CMAX\_H,c} = \mathrm{MIN}\{P_{EMAX,c}, P_{PowerClass} - \Delta G_c - \Delta P_{PowerClass}\}$$

$P_{PowerClass}$ is assumed to be defined by the EIRP value with which the CDF becomes 50%. Accordingly, the above-described "$\Delta G_c$" is a differential value obtained by subtracting the current antenna gain of the user equipment 200 from the antenna gain at a time at which the user equipment 200 achieves the EIRP with which the CDF becomes 50% with respect to the serving cell c. Thus, when the transmission is directed closer to the boresight of the antenna, "$\Delta G_c$" takes a negative value, and when the transmission is directed to a direction to be more deviated from the boresight of the antenna, "$\Delta G_c$" takes a positive value. By correcting $P_{CMAX,c}$ by "$\Delta G_c$," a parameter for calculating the maximum transmission power can be corrected in accordance with antenna gain in a direction in which the user equipment 200 is currently performing transmission, and maximum transmission power can be appropriately set.

Furthermore, similar to Example 1, the user equipment 200 may transmit, to the base station 100, information on the setting of the maximum transmission power calculated by the above-described method based on the antenna gain through UCI, MAC signaling, etc. Additionally, together with the information on the setting of the maximum transmission power, or instead of the information on the setting of the maximum transmission power, information indicating antenna gain in a direction in which the user equipment 200 is currently performing transmission may be transmitted to the base station apparatus 100.

Furthermore, similar to Example 1, the user equipment 200 may insert the above-described information on the setting of the maximum transmission power and/or the information indicating antenna gain into PHR, so that the above-described information on the setting of the maximum transmission power and/or the information indicating antenna gain can be transmitted to the base station apparatus 100. PHR includes information indicating a value obtained by subtracting current transmission power from the maximum transmission power of the user equipment 200. By additionally inserting the information on the setting of the maximum transmission power and/or the information indicating the antenna gain according to Example 1, the base station apparatus 100 can perform accurate transmission power control for the user equipment 200.

Similar to Example 1, based on the information on the setting of the maximum transmission power and/or the information indicating the antenna gain transmitted from the user equipment 200, the base station apparatus 100 performs network control, namely, performs transmission power control and scheduling for the user equipment 200.

In the above-described Example 2, the case of the EIRP value is described with which the CDF becomes 50%. However, for example, an EIRP value may be used with which the CDF becomes 80%, or an EIRP value may be used with which the CDF becomes 30%. The percentage of the CDF, as a reference, can be set to any value, and the EIRP value defined by the percentage of the CDF may be used for the maximum transmission power control. Namely, the maximum transmission power control may be performed based on any intermediate value between the minimum value and the maximum value of the antenna gain achieved by the user equipment 200.

Figure 9:
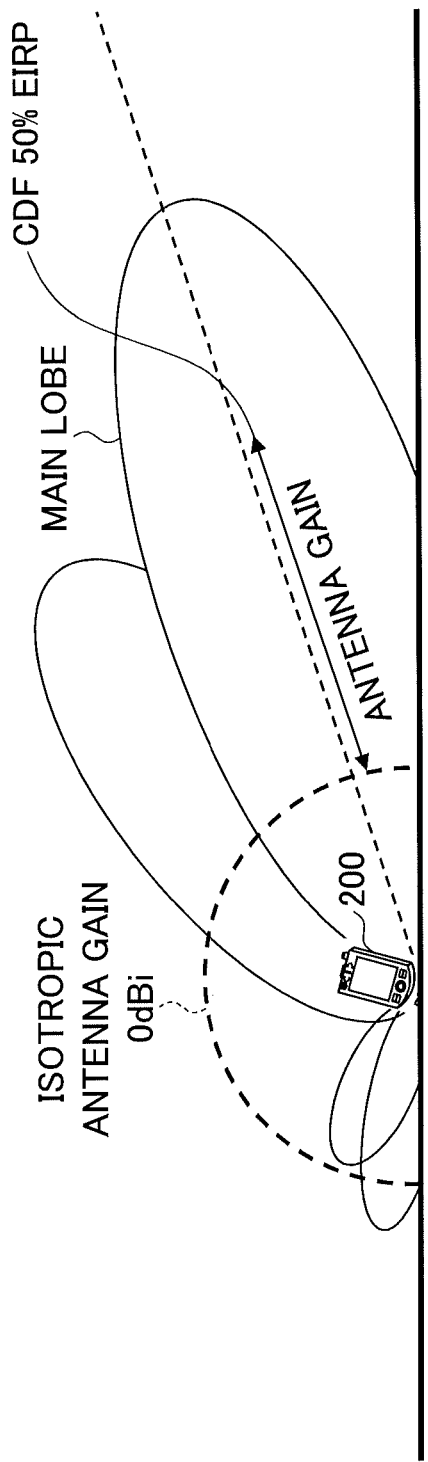
FIG. 9 is a diagram (version 2) illustrating a case according to an embodiment of the present invention in which transmission power is defined in terms of an EIRP value based on a CDF.

FIG. 9 is a diagram (version 2) for illustrating a case in which transmission power is defined by an EIRP value based on a CDF according to an embodiment of the present invention. FIG. 9 schematically illustrates antenna characteristics of the user equipment 200 on a vertical surface.

Similar to FIG. 8, a distance from the dotted line indicated by isotropic antenna gain of 0 dBi to a position at which EIRP with the CDF of 50% is achieved corresponds to the antenna gain. As illustrated in FIG. 9, there is a direction in which a higher antenna gain is achieved with respect to said antenna gain, and there is a direction in which a lower antenna gain is achieved with respect to said antenna gain.

By the above-described Example 2, inappropriate setting of the maximum transmission power can be avoided, such as setting of maximum transmission power less than the capability of the user equipment 200, by setting the maximum transmission power based on the antenna gain in a direction (a direction toward the base station) in which the user equipment 200 is performing transmission. Additionally, inappropriate setting of the maximum transmission power can be avoided, such as setting of maximum transmission power exceeding the capability of the user equipment 200. Accordingly, appropriate transmission power control and scheduling can be achieved.

EXAMPLE 3

Example 3 is described below. In Example 3, points different from Example 1 or Example 2 are described. Accordingly, points that are not particularly described may be the same as those of Example 1 or Example 2.

The maximum transmission power $P_{CMAX,c}$ of the user equipment 200 in LTE is provided by the following formulas.

$$P_{CMAX\_L,c} \leq P_{CMAX,c} \leq P_{CMAX\_H,c}, \text{ where}$$

$$P_{CMAX\_L,c} = \text{MIN}\{P_{EMAX,c} - \Delta T_{C,c}(P_{PowerClass} - \Delta P_{PowerClass}) - \text{MAX}(\text{MPR}_c + \text{A-MPR}_c + \Delta T_{IB,c} + \Delta T_{C,c} + \Delta T_{ProSe}, P\text{-MPR}_c)\}$$

$$P_{CMAX\_H,c} = \text{MIN}\{P_{EMAX,c}, P_{PowerClass} - \Delta P_{PowerClass}\}$$

In Example 3, without introducing $\Delta Gc$, $P_{PowerClass}$ in the above-described formula may represent the EIRP value in the direction in which the user equipment 200 is performing transmission. Namely, $P_{PowerClass}$ may be defined to be a variable representing the EIRP value in the direction in which the user equipment 200 is performing transmission.

By the above-described Example 2, the maximum transmission power can be set by defining $P_{PowerClass}$ including the EIRP value corresponding to the antenna gain in the direction in which the user equipment 200 is performing transmission (the direction toward the base station).

(Device Configuration)

Next, examples of functional configurations of the base station apparatus 100 and the user equipment 200, which perform the process and the operation described above, are described. Each of the base station apparatus 100 and the user equipment 200 includes a function for implementing at least Examples 1, 2, and 3. However, each of the base station apparatus 100 and the user equipment 200 may only include a part of the function for Examples 1, 2, and 3.

<Base Station Apparatus 100>

Figure 10:
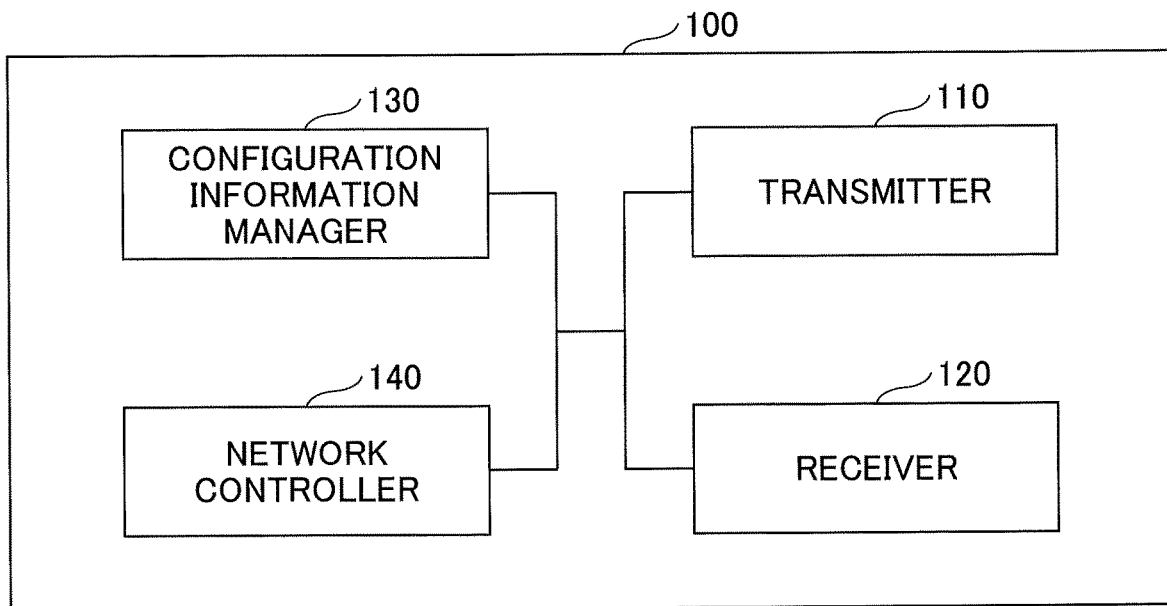
FIG. 10 is a diagram illustrating an example of a functional configuration of a base station apparatus 100 according to an embodiment of the present invention.

FIG. 10 is a diagram illustrating an example of a functional configuration of the base station apparatus 100. As illustrated in FIG. 10, the base station apparatus 100 includes a transmitter 110; a receiver 120; a configuration information manager 130; and a network controller 140. The functional configuration illustrated in FIG. 10 is merely an example. The functional division and names of the functional units may be any division and names, provided that the operation according to the embodiments of the present invention can be executed.

The transmitter 110 includes a function for generating signals to be transmitted to the user equipment 200 and for wirelessly transmitting the signals. The receiver 120 includes a function for receiving various types of signals transmitted from the user equipment 200 and for retrieving, for example, higher layer information from the received signals. Additionally, the transmitter 110 is provided with a function for transmitting, to the user equipment 200, NR-PSS, NR-SSS, NR-PBCH, DL/UL control signals, etc. Additionally, the transmitter 110 transmits, to the user equipment 200, information related to transmission power control and information related to scheduling, and the receiver 120 receives, from the user equipment 200, information related to setting of transmission power and information indicating antenna gain.

The configuration information manager 130 stores preconfigured configuration information and various types of configuration information to be transmitted to the user equipment 200. Content of the configuration information is, for example, information related to the transmission power control, information related to scheduling, etc.

The network controller 140 performs the transmission power control in the base station apparatus 100 for the user equipment 200 and the control related to the scheduling, which are described in Examples 1, 2, and 3. The control may be based on information related to setting of transmission power and information indicating antenna gain which are received from the user equipment 200.

<User Equipment 200>

Figure 11:
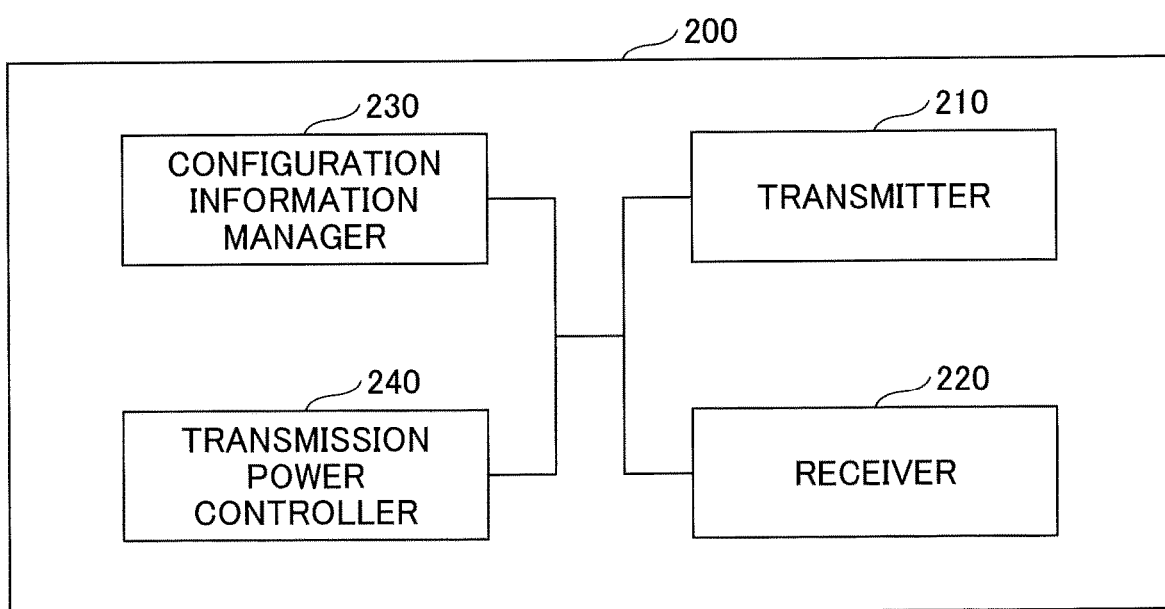
FIG. 11 is a diagram illustrating an example of a functional configuration of user equipment 200 according to an embodiment of the present invention.

FIG. 11 is a diagram illustrating an example of a functional configuration of the user equipment 200. As illustrated in FIG. 11, the user equipment 200 is provided with a transmitter 210; a receiver 220; a configuration information manager 230; and a transmission power controller 240. The functional configuration illustrated in FIG. 11 is merely an example. The functional division and the names of the functional units may be any division and names, provided that the operation according to the embodiments of the present invention can be executed.

The transmitter 210 generates transmission signals from transmission data, and wirelessly transmits the transmission signals. The receiver 220 receives various types of signals through radio, and retrieves higher layer signals from the received physical layer signals. Additionally, the receiver 220 is provided with a function for receiving NR-PSS, NR-SSS, NR-PBCH, DL/UL control signals, etc., which are transmitted from the base station apparatus 100. Additionally, the transmitter 210 transmits, to the base station apparatus 100, information related to setting of transmission power and information indicating antenna gain, and the receiver 220 receives, from the base station apparatus 100, information related to transmission power control and information related to scheduling.

The configuration information manager 230 stores various types of configuration information received from the base station apparatus 100 by the receiver 220. Additionally, the configuration information manager 230 stores preconfigured configuration information. The content of the configuration information is, for example, information related to setting of transmission power, information indicating antenna gain, etc.

The transmission power controller 240 performs control related to setting of transmission power in the user equipment 200, which is described in Examples 1, 2, and 3. Note that a functional unit related to signal transmission in the transmission power controller 240 may be included in the transmitter 210, and a functional unit related to signal reception in the transmission power controller 240 may be included in the receiver 220.

(Hardware Configuration)

The functional configuration diagrams (FIG. 10 and FIG. 11) used for describing the above-described embodiments of the present invention show blocks of functional units. These functional blocks (components) are implemented by any combination of hardware and/or software. Additionally, means for implementing each functional block is not particularly limited. Namely, each functional block may be implemented by a single device in which a plurality of elements is physically and/or logically coupled, or each functional block may be implemented by a plurality of devices, while directly and/or indirectly (e.g., wired and/or wireless) connecting two or more devices that are physically and/or logically separated.

Figure 12:
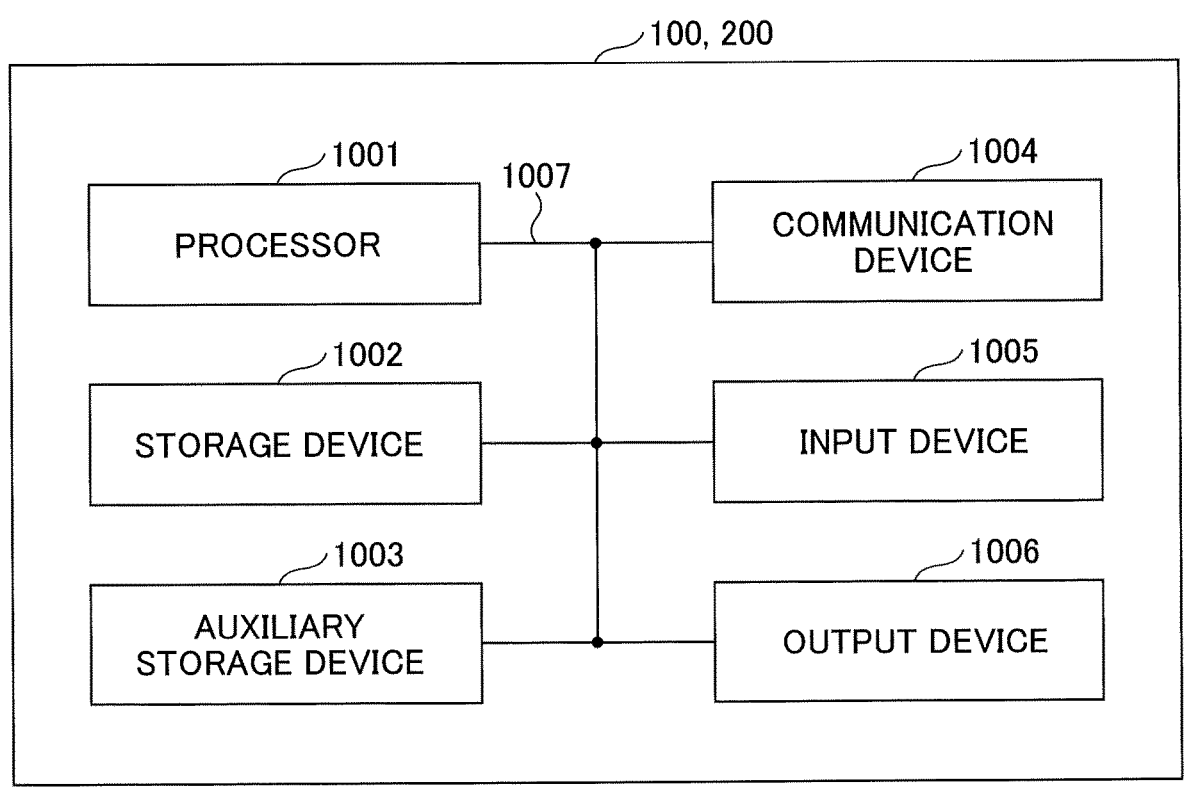
FIG. 12 is a diagram illustrating an example of a hardware configuration of the base station apparatus 100 or the user equipment 200 according to an embodiment of the present invention.

For example, each of the base station apparatus 100 and the user equipment 200 in the embodiments of the present invention may function as a computer that performs processing according to the embodiments of the present invention. FIG. 12 is a diagram illustrating an example of a hardware configuration of a radio communication device, which may be the base station apparatus 100 or the user equipment 200 according to the embodiments of the present invention. Each of the above-described base station apparatus 100 and the user equipment 200 may be physically configured as a computer device including a processor 1001; a storage device 1002; an auxiliary storage device 1003; a communication device 1004; an input device 1005; an output device 1006; a bus 1007, etc.

Note that, in the following description, the term "apparatus" can be read as a circuit, a device, a unit, etc. The hardware configuration of each of the base station apparatus 100 and the user equipment 200 may be configured to include one or more of the respective devices indicated by 1001 through 1006 in the figure, or may be configured not to include a part of the devices.

Each function of the base station apparatus 100 and the user equipment 200 is implemented by loading predetermined software (program) on hardware, such as the processor 1001 and the storage device 1002, so that the processor 1001 performs computation and controls communication by the communication device 1004, and reading and/or writing of data in the storage device 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module and data from the auxiliary storage device 1003 and/or the communication device 1004 to the storage device 1002, and executes various processes according to these. As the program, a program is used which causes a computer to execute at least a part of the operations described in the above-described embodiment. For example, the transmitter 110, the receiver 120, the configuration information manager 130, and the network controller 140 of the base station apparatus 100 illustrated in FIG. 10 may be implemented by a control program stored in the storage device 1002 and executed by the processor 1001. Furthermore, for example, the transmitter 210, the receiver 220, the configuration information manager 230, and the transmission power controller 240 of the user equipment 200 illustrated in FIG. 15 may be implemented by a control program stored in the storage device 1002 and executed by the processor 1001. Although it is described that the above-described various processes are executed by a single processor 1001, the above-described various processes may be simultaneously or sequentially executed by two or more processors 1001. The processor 1001 may be implemented by one or more chips. Note that the program may be transmitted from a network via an electric communication line.

The storage device 1002 is a computer readable recording medium, and the storage device 1002 may be formed of at least one of a read-only memory (ROM), an erasable programmable ROM (EPROM), an electrically erasable programmable ROM (EEPROM), a random access memory (RAM), etc. The storage device 1002 may be referred to as a register, a cache, a main memory (main storage device), etc. The storage device 1002 can store programs (program codes), software modules, etc., that can be executed to perform the process according to the embodiments of the present invention.

The auxiliary storage device 1003 is a computer readable recording medium, and, for example, the auxiliary storage device 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The auxiliary storage device 1003 may be referred to as an auxiliary storage device. The above-described storage medium may be, for example, a database including the storage device 1002 and/or the auxiliary storage device 1003, a server, or any other suitable medium.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitter 110 and the receiver 120 of the base station apparatus 100 may be implemented by the communication device 1004. Additionally, the transmitter 210 and the receiver 220 of the user equipment 200 may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the storage device 1002, are connected by a bus 1007 for communicating information. The bus 1007 may be formed of a single bus, or the bus 1007 may be formed of buses that are different among the devices.

Furthermore, each of the base station apparatus 100 and the user equipment 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 1001 may be implemented by at least one of these hardware components.

Conclusion of the Embodiments

As described above, according to the embodiments of the present invention, there is provided user equipment for communicating with a base station apparatus including a transmitter that performs transmission to the base station apparatus while performing beam forming using an antenna with directivity; and a controller that controls maximum transmission power of the transmission with the beam forming based on gain of the antenna.

With the above-described configuration, the user equipment can perform appropriate transmission power control based on the antenna gain.

The gain may be maximum gain of the antenna. With this configuration, setting of excessive maximum transmission power exceeding capability of the user equipment can be prevented.

The gain may be an intermediate value between maximum gain and minimum gain of the gain of the antenna. With this configuration, setting of maximum transmission power less than the capability of the user equipment can be prevented.

Information related to maximum transmission power controlled by the controller or information representing the gain of the antenna may be transmitted to the base station apparatus. With this configuration, the base station apparatus can perform appropriate transmission power control and scheduling, based on the information received from the user equipment.

Information related to maximum transmission power controlled by the controller or information representing the gain of the antenna may be inserted into information for reporting a power head room to the base station apparatus. With this configuration, the base station apparatus can perform appropriate transmission power control and scheduling, based on the PHR received from the user equipment.

There is provided a base station apparatus for communicating with user equipment, the base station apparatus including a receiver that receives, from the user equipment, information related to maximum transmission power of transmission with beam forming by the user equipment or information representing gain of an antenna related to the beam forming by the user equipment; and a network controller that performs transmission power control and scheduling for the user equipment, based on the information related to the maximum transmission power or the information representing the gain of the antenna.

With the above-described configuration, the base station apparatus can perform appropriate transmission power control and scheduling for the user equipment, based on the information related to the maximum transmission power or the information representing the antenna gain reported from the user equipment.

Supplemental Embodiments

The embodiments of the present invention are described above. However, the disclosed invention is not limited to the above-described embodiments, and those skilled in the art would appreciate various modified examples, revised examples, alternative examples, substitution examples, and so forth. In order to facilitate understanding of the invention, specific numerical value examples are used for description. However, the numerical values are merely examples, and any suitable values may be used unless as otherwise specified. The classification of items in the above description is not essential to the present invention. Matter described in two or more items may be combined and used as necessary, and matter described in one item may be applied to matter described in another item (provided that they do not contradict). The boundary between functional units or processing units in a functional block diagram does not necessarily correspond to the boundary between physical components. Operations of a plurality of functional units may be performed physically by one component, or an operation of one functional unit may be physically performed by a plurality of parts. The order of the procedures described in the embodiments may be changed, provided that they do not contradict. For the sake of convenience of processing description, the base station apparatus 100 and the user equipment 200 are described using the functional block diagrams. However, such devices may be implemented by hardware, software, or a combination thereof. Each of software executed by the processor included in the base station apparatus 100 according to the embodiments of the present invention and software executed by the processor included in the user equipment 200 according to the embodiments of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspects/embodiments described in the present specification and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems extended on the basis of these systems.

In processing procedures, sequences, flowcharts, etc., of each embodiment/modified example described in the specification, the order may be changed provided that there is no contradiction. For example, for the methods described in the specification, the elements of the various steps are presented in an exemplary order and are not limited to a specific order presented.

The specific operations that are described in the specification to be performed by the base station apparatus 100 may be performed by their upper nodes in some cases. In a network formed of one or more network nodes including the base station apparatus 100, it is apparent that the various operations performed for communication with the user equipment 200 may be performed by the base station apparatus 100 and/or a network node other than the base station apparatus 100 (e.g., MME or S-GW can be considered, however, not limited to these). In the above description, a case is exemplified in which there is one network node other than the base station apparatus 100. However, it can be a combination of other network nodes (e.g., MME and S-GW).

Each aspect/embodiment described in this specification may be used alone, may be used in combination, or may be used while being switched during the execution.

The user equipment 200 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

The base station apparatus 100 may be referred to, by a person ordinarily skilled in the art, as a NodeB (NB), an enhanced NodeB (eNB), gNB, a base station (Base Station), or any other suitable terms.

The terms "determine (determining)" and "decide (determining)" used in this specification may include various types of operations. For example, "determining" and "deciding" may include deeming that a result of judging, calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "based on" used in the present specification does not mean "based on only" unless as otherwise specified explicitly. In other words, the expression "based on" means both "based on only" and "based on at least."

As long as "include," "including," and variations thereof are used in this specification or the claims, the terms are intended to be inclusive in a manner similar to the term "comprising." Furthermore, the term "or" used in the specification or claims is intended not to be an exclusive OR.

In the whole of the present disclosure, for example, if articles are added by translation, such as "a," "an," and "the," these articles may include a plural forms, unless as otherwise indicated explicitly by the context.

Note that the transmission power controller 240 is an example of a controller.

The present invention is described in detail above. It is apparent for a person ordinarily skilled in the art that the present invention is not limited to the embodiments described in the present specification. The present invention can be implemented as modified embodiments and altered embodiments without departing from the gist and scope of the present invention defined by the scope of the claims. Accordingly, the descriptions of the present specification are for the purpose of illustration and do not have any restrictive meaning to the present invention.

This international patent application is based on and claims priority to Japanese Patent Application No. 2017-151737 filed on Aug. 4, 2017, and the entire content of Japanese Patent Application No. 2017-151737 is incorporated herein by reference.

LIST OF REFERENCE SYMBOLS 100 base station apparatus
200 user equipment
110 transmitter
120 receiver
130 configuration information manager
140 network controller
200 user equipment
210 transmitter
220 receiver 230 configuration information manager
240 transmission power controller
1001 processor
1002 storage device
1003 auxiliary storage device
1004 communication device
1005 input device
1006 output device

The invention claimed is:

1. A terminal for communicating with a base station apparatus, the terminal comprising:
 a controller that sets maximum transmission power based on an Effective Isotropic Radiated Power (EIRP) of the terminal; and
 a transmitter that transmits an uplink signal based on the maximum transmission power, wherein the controller obtains the EIRP from an EIRP in a peak direction of a transmission beam of the uplink signal, and
 wherein the transmitter transmits information for reporting a power head room, using a Medium Access Control Control Element (MAC CE), including information on the maximum transmission power related to antenna gain in a direction in which the terminal is performing transmission.

2. The terminal according to claim 1, wherein the uplink signal is precoded.

3. The terminal according to claim 2, wherein the controller sets the EIRP according to a power class of the terminal.

4. The terminal according to claim 2, wherein the EIRP is peak EIRP of the terminal.

5. The terminal according to claim 1, wherein the controller sets the EIRP according to a power class of the terminal.

6. The terminal according to claim 1, wherein the EIRP is peak EIRP of the terminal.

7. A communication method by a terminal for communicating with a base station apparatus, the communication method comprising:
 setting maximum transmission power based on an Effective Isotropic Radiated Power (EIRP) of the terminal;
 transmitting an uplink signal based on the maximum transmission power; and
 transmitting information for reporting a power head room, using a Medium Access Control Control Element (MAC CE), including information on the maximum transmission power related to antenna gain in a direction in which the terminal is performing transmission,
 wherein the EIRP is obtained from an EIRP in a peak direction of a transmission beam of the uplink signal.

* * * * *